US006222367B1

(12) United States Patent
Shimizu et al.

(10) Patent No.: US 6,222,367 B1
(45) Date of Patent: Apr. 24, 2001

(54) COMBUSTION STATE DETECTING DEVICE FOR AN INTERNAL COMBUSTION ENGINE

(75) Inventors: Takeshi Shimizu; Koichi Okamura; Mituru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,003

(22) Filed: May 28, 1999

(30) Foreign Application Priority Data

Dec. 28, 1998 (JP) ................................................ 10-373411

(51) Int. Cl.[7] ............................ G01M 15/00; F02P 17/00

(52) U.S. Cl. ........................... 324/380; 324/378; 324/459

(58) Field of Search .................................... 324/378, 380, 324/388, 391, 393, 459, 464

(56) References Cited

U.S. PATENT DOCUMENTS 5,087,882 * 2/1992 Iwata .................................... 324/388
5,230,240 * 7/1993 Ohsawa et al. ......................... 73/116
5,534,781 * 7/1996 Lee et al. ............................. 324/380
5,778,855 * 7/1998 Czekala et al. ....................... 123/416
5,895,839 * 4/1999 Takahashi et al. ............... 324/378 X
6,040,698 * 3/2000 Takahashi et al. ................... 324/399
6,054,859 * 4/2000 Takahashi et al. ................... 324/399

* cited by examiner

*Primary Examiner*—Glenn W. Brown
(74) *Attorney, Agent, or Firm*—Sughrue, Mion, Zinn, Macpeak & Seas, PLLC

(57) ABSTRACT

There is provided a combustion state detecting device for an internal combustion engine even in the case where disconnection of a secondary current path or misfire in an ignition plug occurs. A voltage developed at the secondary winding low voltage side is suppressed so that the high voltage can be prevented from being leaked. The combustion state detecting device for an internal combustion engine includes a capacitor 8 for charging a positive bias voltage necessary for detecting ions generated when an ignition plug 4 discharges upon application of the ignition high voltage, a resistor 5 disposed between the low voltage side of the secondary winding and the capacitor for suppressing the drop of the bias voltage, ion current detecting means 30 for detecting a discharge current from the capacitor as an ion current flowing through the ignition plug, an ECU 20 for detecting a combustion state in the ignition plug on the basis of a detection value of the ion current detecting means, and a Zener diode 9 for suppressing a voltage developed when a path in which the ion current flows is disconnected.

8 Claims, 7 Drawing Sheets

COMBUSTION STATE DETECTING DEVICE FOR AN INTERNAL COMBUSTION ENGINE

BACKGROUND OF THE INVENTION

1. Field of the Invention

The present invention relates to a combustion state detecting device for detecting a combustion state of an internal combustion engine by detection of a change in the quantity of ions which are produced at the time of burning the internal combustion engine, and more particularly to a combustion state detecting device for an internal combustion engine which is capable of preventing a high-voltage leakage caused by the disconnection of a secondary current path in the internal combustion engine with a low-voltage distribution.

2. Description of the Related Art

In general, in an internal combustion engine driven by a plurality of cylinders, the fuel-air mixture consisting of air and fuel introduced into the combustion chambers of the respective cylinders is compressed by moving up pistons, electric sparks are generated by applying an ignition high voltage to ignition plugs disposed within the combustion chambers, and an explosion force developed at the time of burning the fuel-air mixture is converted into a piston push-down force, to thereby extract the piston push-down force as an rotating output of the internal combustion engine.

There has been known that since molecules within the combustion chambers are ionized when the fuel-air mixture has been burned in the combustion chambers, ions having electric charges flow between the ignition plugs as an ion current upon application of a bias voltage to ion current detection electrodes (as usual, ignition plug electrodes are used) located within the combustion chambers.

Also, there has been known that the combustion state of the internal combustion engine can be detected by detection of a state in which the ion current occurs because the ion current is sensitively varied according to the combustion state within the combustion chambers.

FIG. 5 is a circuit structural diagram showing one example of a conventional combustion state detecting device for an internal combustion engine using a low-voltage distribution as disclosed in Japanese Patent Application Laid-open No. Hei 10-231770.

In the figure, an anode of a battery 1 mounted on a vehicle is connected to one end of a primary winding 2*a* of an ignition coil 2, whereas the other end of the primary winding 2*a* is connected to the ground through a power transistor 3 an emitter of which is grounded for interrupting the supply of a primary current.

A secondary winding 2*b* of the ignition coil 2 constitutes a transformer in cooperation with the primary winding 2*a*, and a high voltage side of the secondary winding 2*b* is connected to one end of the ignition plugs 4 of the respective cylinders (not shown) to output a high voltage of negative polarity at the time of controlling ignition.

Each of the ignition plugs 4 composed of counter electrodes is applied with the ignition high voltage to discharge and fire the fuel-air mixture within each of the cylinders.

The ignition coil 2 and the ignition plug 4 are disposed in parallel for each of the cylinders, however, in this example, only one pair of ignition coil 2 and ignition plug 4 are representatively shown.

A low voltage side of the secondary winding 2*b* is connected to an ion current detecting circuit 10 through a resistor 5 and a diode 6 which are connected in parallel and constitute current limiting means.

The resistor 5 suppresses a discharge current that flows from a capacitor C within the ion current detecting circuit 10 to the ignition plug 4 through the secondary winding 2*b* and suppresses a voltage developed at the high voltage side of the secondary winding 2*b* at the time of starting the supply of the current to the primary winding 2*a*.

The diode 6 is provided so that a direction of the secondary current (ignition current) I2 flowing at the time of applying the ignition high voltage becomes forward, and is arranged so as to suppress a potential difference between both ends of the resistor 5 at the time of controlling ignition.

The ion current detecting circuit 10 applies a bias voltage of a polarity opposite to the ignition polarity, that is, the positive polarity through the resistor 5 and the diode 6 which are connected in parallel and the secondary winding 2*b* detect an ion current corresponding to the quantity of ions generated at the time of burning.

The ion current detecting circuit 10 includes a capacitor C connected to the low voltage side of the secondary winding 2*b* through the resistor 5 and the diode 6 which are connected in parallel, a diode D disposed between the capacitor C and the ground, a resistor R connected in parallel with the diode D, and a Zener diode DZ for bias voltage limit which is connected in parallel with the capacitor c and the diode D.

A series circuit consisting of the capacitor C and the diode D and the Zener diode DZ connected in parallel with the series circuit are disposed between the low voltage side of the secondary winding 2*b* and the ground to constitute a charging path for charging the capacitor C with the bias voltage at the time of generating the ignition current.

The capacitor C is charged with the secondary current flowing therein through the ignition plug 4 which is discharged at a high voltage outputted from the secondary winding 2*b* when the power transistor 3 is off (when the current supplied to the primary winding 2*a* is interrupted). The charge voltage is limited to a predetermined bias voltage (for example, about several hundreds V) by the Zener diode DZ, and functions as bias means for ion current detection, that is, a power supply.

The resistor R within the ion current detecting circuit 10 converts an ion current flowing with the bias voltage into a voltage, and inputs the current to an ECU (electronic control unit) 20 as an ion current detection signal Ei.

The ECU 20 formed of a microcomputer judges the combustion state of the internal combustion engine on the basis of the ion current detection signal Ei, and conducts appropriate adaptive control so that no inconvenience occurs when it detects the deterioration of the combustion state.

Also, the ECU 20 arithmetically operates an ignition timing, etc., on the basis of travel conditions obtained from a variety of sensors (not shown) to output not only an ignition signal P to the power transistor 3 but also a fuel injection signal to an injector (not shown) for each of the cylinders and a drive signal to a variety of actuators (a throttle valve, an ISC valve, etc.).

FIG. 6 is an explanatory diagram showing a path of current flowing in the secondary winding 2*b* and the ion current detecting circuit 10 through the current limiting means, in which a path of a secondary current I2 flowing at a high voltage during the discharging operation of the ignition plug 4 (at the time of controlling ignition) is indicated by a solid line, whereas a path of an ion current i flowing at the bias voltage at the time of detecting the ion current is indicated by a dashed line.

Subsequently, the operation of the conventional combustion state detecting device for an internal combustion engine shown in FIG. 5 will be described with reference to FIG. 6.

As usual, the ECU 20 arithmetically operates the ignition timing, etc., in accordance with the travel conditions, and supplies the ignition signal P to the base of the power transistor 3 at a desired control timing to control the on/off operation of the power transistor 3.

As a result, the power transistor 3 interrupts the primary current flowing in the primary winding 2*a* of the ignition coil 2 to boost the primary voltage, and also develops the ignition high voltage (for example, several tens kV) at the high voltage side of the secondary winding 2*b*.

The secondary voltage is applied to the ignition plug 4 for each of the cylinders and allowed to generate a discharge spark within the combustion chamber to burn the fuel-air mixture. In this situation, if the combustion state is normal, a required quantity of ions are generated in the periphery of the ignition plug and within the combustion chamber.

Then, as described above, when the power transistor 3 is turned on in response to the ignition signal P, the current in the primary winding 2*a* starts to flow therein, to thereby develop the voltage of the positive polarity at the high voltage side of the secondary winding 2*b*.

In this situation, since the discharge current from the capacitor C to the low voltage side of the secondary winding 2*b* is limited by the resistor 5, the voltage developed at the secondary winding 2*b* is divided to the high voltage side and the low voltage side without being superimposed on the bias voltage.

At the time of starting the flow of a current in the primary winding 2*a*, even if the voltage of the positive polarity is developed at the high voltage side of the secondary winding 2*b*, since the discharge current from the capacitor C to the low voltage side of the secondary winding 2*b* is limited by the resistor 5 as described above, the voltage of the positive polarity developed at the high voltage side of the secondary winding 2*b* is suppressed so that there is no case in which the ignition plug 4 discharges.

Sequentially, at the time of interrupting the primary current, if the ignition high voltage is developed at the high voltage side of the secondary winding 2*b* to make the ignition plug 4 discharge, the secondary current I2 flows in the path (an arrow indicated by a solid line in FIG. 6) through the diode 6 to charge the capacitor C up to a predetermined voltage.

Also, since ions are generated by the discharge of the ignition plug 4, the ion current i flows in a path (an arrow indicated by a dashed line in FIG. 6) through the resistor 5.

In this way, with the diode 6 being connected in parallel with the current limit resistor 5, the secondary current I2 at the time of controlling ignition flows into the diode 6 without flowing in the resistor 5. Since this makes the potential difference between both ends of the resistor 5 drop, the ignition performance is improved.

Also, at the time of starting the flowing of the primary current, since the current limit function of the resistor 5 becomes effective, the discharge current from the capacitor C to the secondary winding 2*b* is limited to prevent malcontrol and the drop of the bias voltage.

The conventional combustion state detecting device for an internal combustion engine thus structured suffers from problems stated below.

That is, in the case where disconnection occurs in the secondary current path, for example, when disconnection occurs at a position indicated by (A) in FIG. 5 or misfire occurs in the ignition plug 4, the voltage (its peak voltage is about 40 kV) developed at the secondary winding high voltage side vibrates as indicated by a broken line in FIG. 7, and the vibration of a voltage (its peak voltage is about 8 kV) which is different in amplitude from but synchronous with that of the high voltage side occurs even at the low voltage side. However, the vibrations appearing at the positive polarity side is limited by the bias voltage limit Zener diode DZ at the low voltage side so as to be suppressed to about 200 V or less.

Also, in the case where disconnection occurs at positions indicated by (B) and (C) in FIG. 5, although the capacitive discharge occurs in the ignition plug 4, discharge does not continue because the secondary current path is not formed with the result that operation is not normally made as the ignition device.

Accordingly, the conventional device suffers from such a problem that in the case where disconnection of the secondary current path or misfire in the ignition plug occurs, the high voltage is developed at the secondary winding low voltage side, so that it is leaked to the ion current detecting circuit, etc., to thereby damage the parts within that circuit, or because the secondary current path is not formed due to the disconnection of the secondary current path, discharge does not continue, as a result of which operation is not normally made as the ignition device.

SUMMARY OF THE INVENTION

The present invention has been made in order to solve the above problems, and therefore an object of the present invention is to provide a combustion state detecting device for an internal combustion engine which is capable of preventing a high voltage from being leaked by suppressing a voltage developed at the secondary winding low voltage side and also ensuring the normal operation as an ignition device, even when disconnection of the secondary current path or misfire in an ignition plug occurs.

According to a first aspect of the present invention, a combustion state detecting device for the internal combustion engine is comprised of: an ignition coil formed of a transformer having a primary winding and a secondary winding for developing a negative ignition high voltage at a high voltage side of the secondary winding when a current to the primary winding is interrupted; an ignition plug connected to the high voltage side of the secondary winding, the ignition high voltage being applied to the ignition plug; bias means for charging a positive bias voltage necessary for detecting ions generated when the ignition plug discharges upon application of the ignition high voltage; current limiting means disposed between the low voltage side of the secondary winding and the bias means for suppressing the drop of the bias voltage; ion current detecting means for detecting a discharge current from the bias means as an ion current flowing through the ignition plug; an ECU for detecting a combustion state in the ignition plug on the basis of a detection value of the ion current detecting means; and suppressing means for suppressing a voltage developed when a path in which the ion current flows is disconnected.

According to a second aspect of the present invention, in the first aspect of the present invention, the suppressing means comprises a first diode and a second diode which are connected in series between the low voltage side of the secondary winding and the ground.

According to a third aspect of the present invention, in the first aspect of the present invention, the first diode comprises a Zener diode.

According to a fourth aspect of the present invention, in the first aspect of the present invention, the first and second diode comprise a Zener diode, respectively.

According to a fifth aspect of the present invention, in the first aspect of the present invention, a combustion state detecting device for the internal combustion engine is comprised of: an ignition coil formed of a transformer having a primary winding and a secondary winding for developing a negative ignition high voltage at a high voltage side of the secondary winding when a current to the primary winding is interrupted; an ignition plug connected to the high voltage side of the secondary winding, the ignition high voltage being applied to the ignition plug; bias means for charging a positive bias voltage necessary for detecting ions generated when the ignition plug discharges upon application of the ignition high voltage; current limiting means disposed between the low voltage side of the secondary winding and the bias means for suppressing the drop of the bias voltage; ion current detecting means for detecting a discharge current from the bias means as an ion current flowing through the ignition plug; and an ECU for detecting a combustion state in the ignition plug on the basis of a detection value of the ion current detecting means, the bias means and the current limiting means are sealed with an insulation sealant of the ignition coil.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
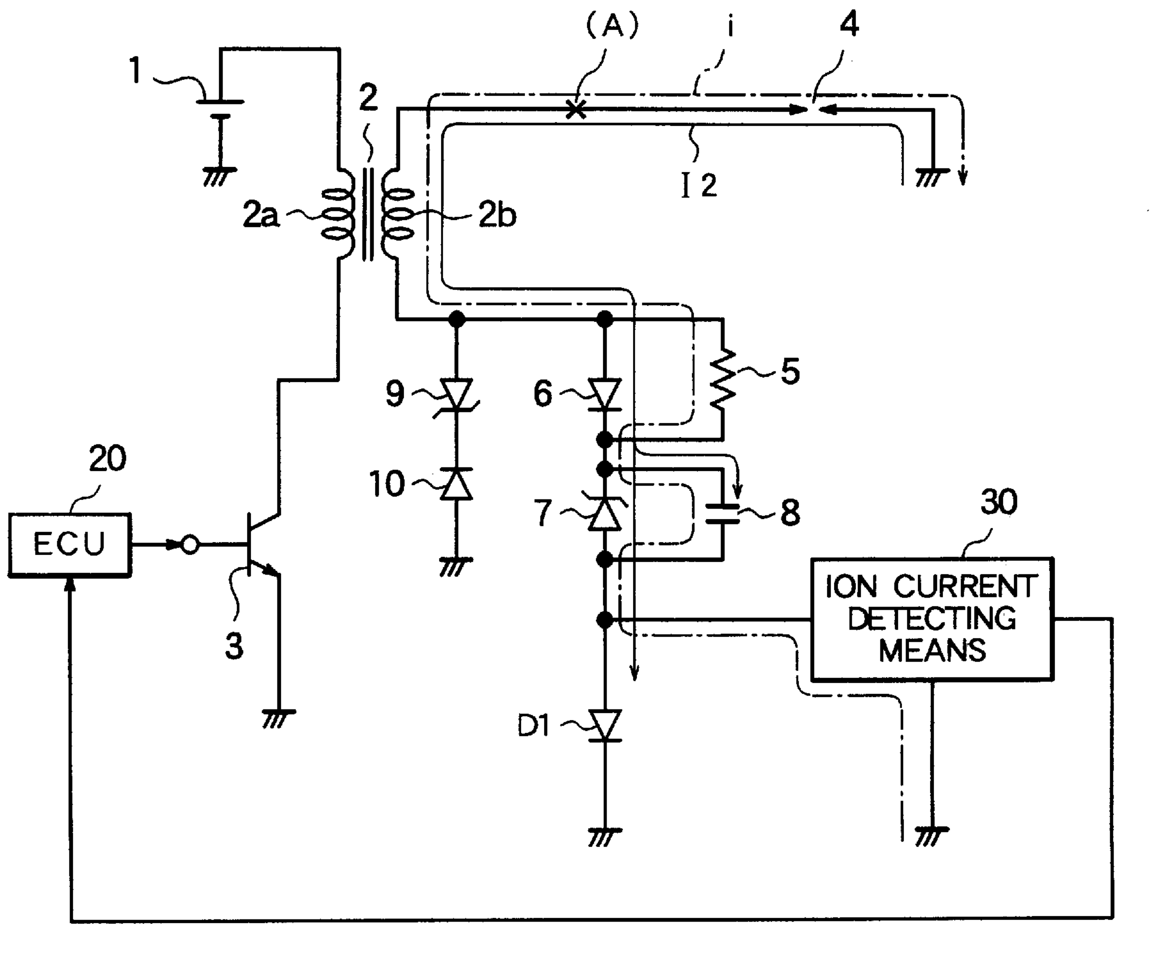
FIG. 1 is a circuit structural diagram showing a combustion state detecting device for an internal combustion engine in accordance with a first embodiment of the present invention.
Figure 5:
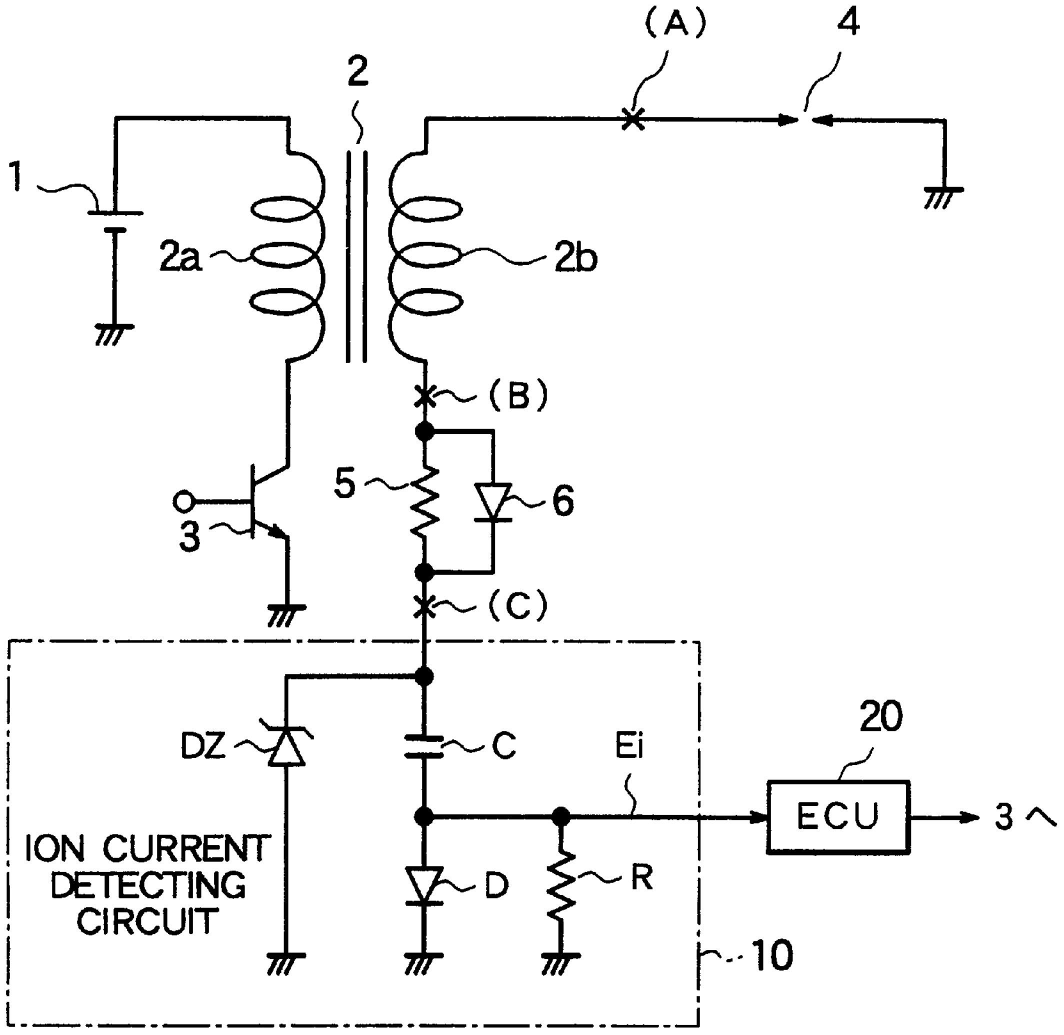
FIG. 5 PRIOR ART
FIG. 5 is a circuit structural diagram showing a conventional combustion state detecting device for an internal combustion engine.
Figure 6:
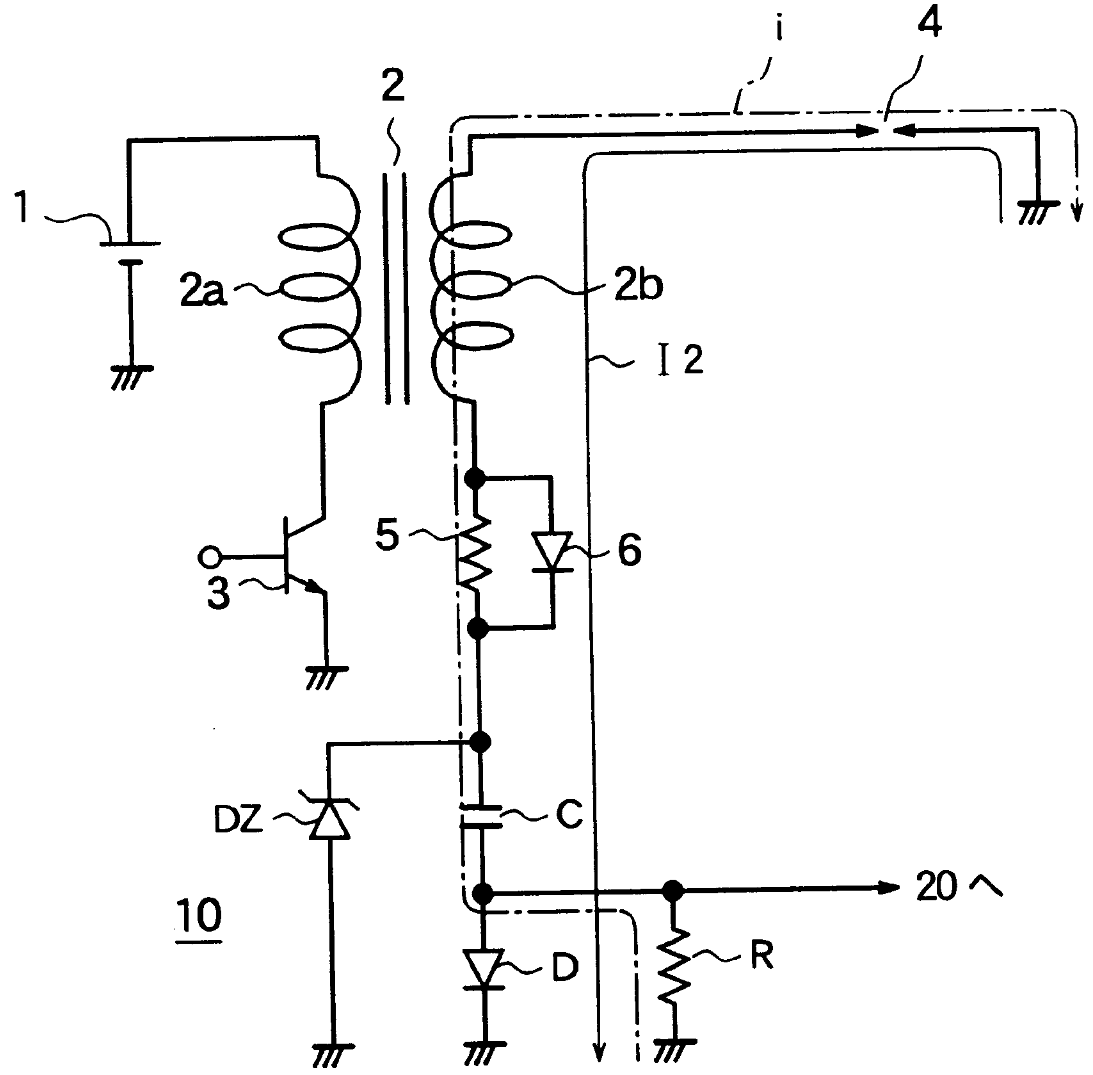
FIG. 6 PRIOR ART
FIG. 6 is a diagram showing a secondary current path at the time of ignition control and an ion current path at the time of detecting an ion current in the conventional combustion state detecting device for an internal combustion engine.
Figure 7:
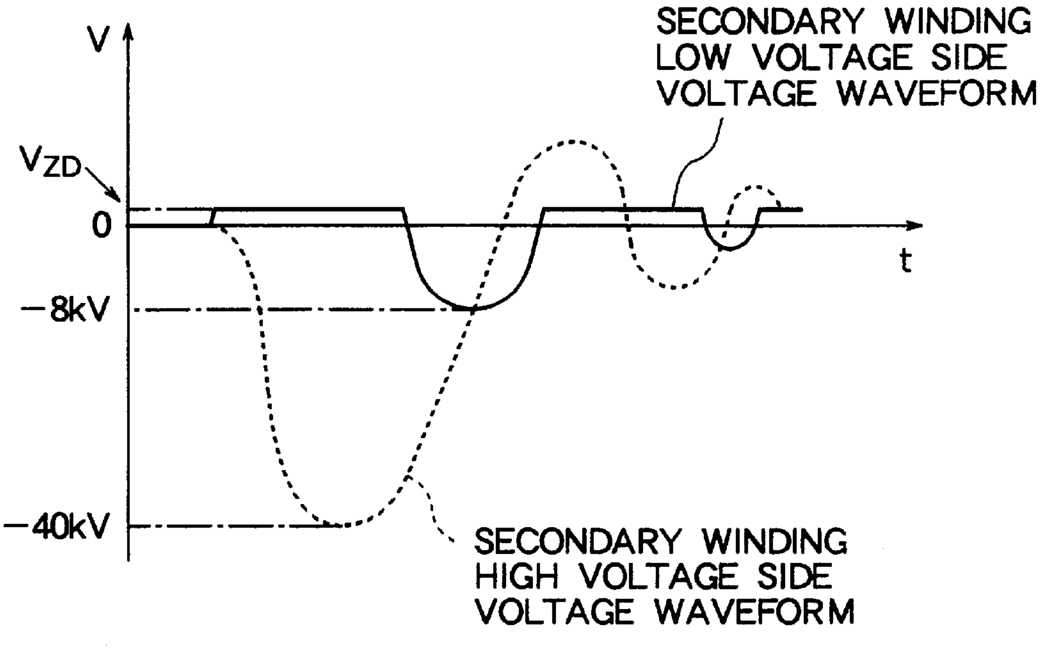
FIG. 7 PRIOR ART
FIG. 7 is a diagram for explanation of the operation of the conventional combustion state detecting device for an internal combustion engine.

FIG. 1 is a structural diagram showing a combustion state detecting device for an internal combustion engine in accordance with a first embodiment of the present invention, in which parts corresponding to those in FIG. 5 are indicated by the same references, and their duplicated description will be omitted.

In this embodiment, a Zener diode 9 for limitation of a voltage at the disconnection time, an anode of which is connected to the secondary winding 2*b* side and a diode 10 for prevention of current supply at the non-disconnection time, an anode of which is connected to the ground side are connected in series between a low voltage side of a secondary winding 2*b* and the ground. The Zener diode 9 and the diode 10 constitute suppressing means for suppressing a high voltage developed at the secondary winding low voltage side when disconnection of the secondary current path or misfire in an ignition plug 4 occurs.

The cathode of a Zener diode 7 for limitation of a bias voltage is connected to a node of the cathode of a diode 6 for a charge current path and one end of a resistor 5 for limitation of a discharge current, and the anode of the Zener diode 7 is grounded to the ground through a diode D1. Also, a capacitor 8 for the bias voltage is connected in parallel with the Zener diode 7. The Zener diode 7 and the capacitor 8 constitute bias means. The input side of an ion current detecting means 30 is connected to the anode of the Zener diode 7, and its output side is connected to an ECU 20. Other structures are identical with those in FIG. 5.

Figure 2:
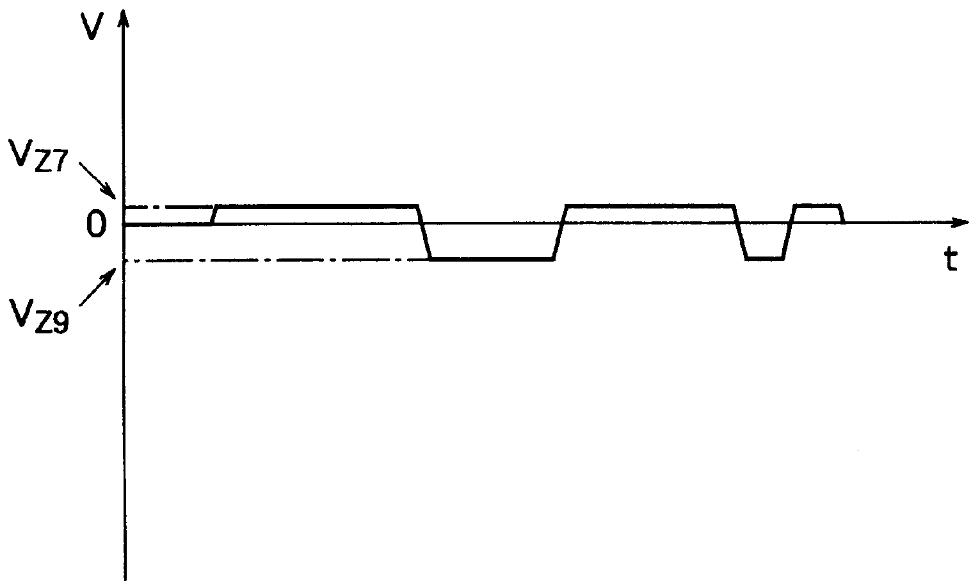
FIG. 2 is a diagram for explanation of the operation of the combustion state detecting device for an internal combustion engine in accordance with the respective embodiments of the present invention.

Subsequently, the operation will be described with reference to FIG. 2.

As usual, the ECU 20 arithmetically operates an ignition timing, etc., in accordance with the travel conditions, and supplies an ignition signal P to the base of a power transistor 3 at a desired control timing to thus control the on/off operation of the power transistor 3.

As a result, the power transistor 3 interrupts the primary current flowing in a primary winding 2*a* of an ignition coil 2 to boost the primary voltage, and also develops an ignition high voltage (for example, several tens kV) at the high voltage side of the secondary winding 2*b*.

The secondary voltage is applied to the ignition plug 4 for each of cylinders and allowed to generate a discharge spark within the combustion chamber of the ignition control cylinder to burn the fuel-air mixture. In this situation, if the combustion state is normal, a required quantity of ions are generated in the byperiphery of the ignition plug and within the combustion chamber.

Then, as described above, when the power transistor 3 is turned on in response to the ignition signal P, the current in the primary winding 2*a* starts to flow therein, to thereby develop a voltage of the positive polarity at the high voltage side of the secondary winding 2*b*.

In this situation, since the discharge current from the capacitor 8 to the low voltage side of the secondary winding 2*b* is limited by the resistor 5, the voltage developed at the secondary winding 2*b* is divided to the high voltage side and the low voltage side without being superimposed on the bias voltage.

At the time of starting the flow of a current in the primary winding 2*a*, even if the voltage of the positive polarity is developed at the high voltage side of the secondary winding 2*b*, since the discharge current from the capacitor 8 to the low voltage side of the secondary winding 2*b* is limited by the resistor 5 as described above, the voltage of the positive polarity developed at the high voltage side of the secondary winding 2*b* is suppressed so that there is no case in which the ignition plug 4 discharges.

Sequentially, at the time of interrupting the primary current, if the ignition high voltage is developed at the high voltage side of the secondary winding 2*b* to make the ignition plug 4 discharge, the secondary current I2 which is the ignition current flows in a path passing through the diode 6 as indicated by an arrow indicated by a solid line in FIG. 1, to thereby charge the capacitor 8 up to a predetermined voltage.

Also, since ions are generated by the discharge of the ignition plug 4, the ion current i flows in a path passing through the resistor 5 as indicated by an arrow indicated by a dashed line in FIG. 1.

In this way, with the diode 6 being connected in parallel with the current limit resistor 5, the secondary current I2 at the time of controlling ignition flows into the diode 6 without flowing in the resistor 5. Since this makes the potential difference between both ends of the resistor 5 drop, the ignition performance is improved.

Also, at the time of starting the flowing of the primary current, since the current limit function of the resistor 5 becomes effective, the discharge current from the capacitor 8 to the secondary winding 2*b* is limited to prevent malcontrol and the drop of the bias voltage.

In the case where disconnection at a position indicated by (A) in FIG. 1 or misfire in the ignition plug 4 occurs, a high voltage is developed at the secondary winding low voltage side so that the high voltage vibrates positively and negatively. However, as shown in FIG. 2, the voltage at a positive side is suppressed by an avalanche voltage $V_{Z7}$ across the Zener diode 7 for limitation of the bias voltage whereas the voltage at the negative side is suppressed by an avalanche voltage $V_{Z9}$ across the Zener diode 9 disposed as suppressing means.

Also, the diode 10 connected in series to the Zener diode 9 prevents the secondary current from not flowing into the bias circuit and directly to the ground through the suppressing means at a normal time where no disconnection occurs.

With the above structure, in this embodiment, even in the case where disconnection at a position indicated by (A) in the secondary current path or misfire in the ignition plug occurs, a voltage developed at the secondary winding low voltage side is suppressed so that the high voltage can be prevented from being leaked to the circuit parts of the ion current detecting means, parts of other circuits, etc., and also the normal operation as the ignition device can be maintained.

(Second Embodiment)

Figure 3:
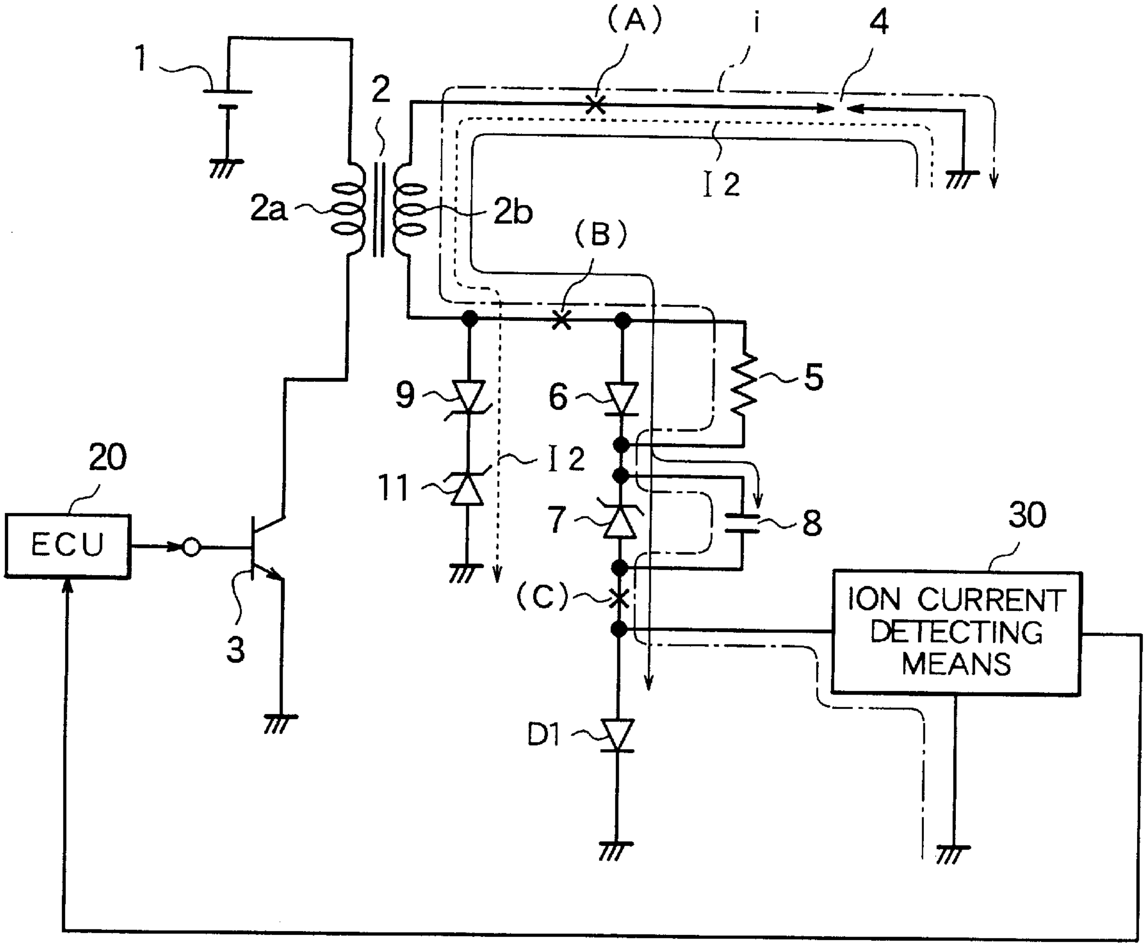
FIG. 3 is a circuit structural diagram showing a combustion state detecting device in accordance with a second embodiment of the present invention.

FIG. 3 is a structural diagram showing a combustion state detecting device for an internal combustion engine in accordance with a second embodiment of the present invention, in which parts corresponding to those in FIG. 1 are indicated by the same references, and their duplicated description will be omitted.

In this embodiment, the diode 10 for prevention of current supply at the non-disconnection time which is connected in series to the Zener diode 9 for limitation of a voltage at the disconnection time between the low voltage side of the secondary winding 2*b* and the ground is replaced by a Zener diode 11 for a secondary current path at the disconnection time in FIG. 1. The Zener diode 9 and the Zener diode 11 constitute suppressing means for suppressing a high voltage developed at the secondary winding low voltage side when disconnection of the secondary current path or misfire in the ignition plug 4 occurs.

The avalanche voltage across the Zener diode 11 for the secondary current path at the disconnection time is set to be higher than avalanche voltage across the Zener diode 7 for limitation of the bias voltage in such a manner that the secondary current is prevented from flowing into the bias means but directly to the ground through the suppressing means. Other structures are identical with those in FIG. 1.

Subsequently, the operation will be described. The normal operation is identical with that in FIG. 1, and its description will be omitted.

In the case where disconnection at a position indicated by (A) in FIG. 3 or misfire in the ignition plug 4 occurs, a high voltage is developed at the secondary winding low voltage side so that the high voltage vibrates positively and negatively. However, as shown in FIG. 2, the voltage at a positive side is suppressed by an avalanche voltage $V_{Z7}$ across the Zener diode 7 for limitation of the bias voltage, whereas the voltage at the negative side is suppressed by an avalanche voltage $V_{Z9}$ across the Zener diode 9 disposed as suppressing means.

Also, the Zener diode 11 connected in series to the Zener diode 9 prevents the secondary current from flowing into the bias circuit but directly to the ground through the suppressing means at a normal time where no disconnection occurs.

In the case where disconnection is made at positions indicated by (B) and (C) in FIG. 3, because the secondary current I2 flows to the ground through the Zener diode 9 and the Zener diode 11 as indicated by a broken line in the figure, the secondary current path is ensured. Also, at the normal time where no disconnection occurs, the secondary current I2 flows to the Zener diode 7 and the capacitor 8 side as the bias means as indicated by a solid line in the figure.

With the above structure, in this embodiment, even in the case where disconnection at the position indicated by (A) in the secondary current path or misfire in the ignition plug occurs, a voltage developed at the secondary winding low voltage side is suppressed so that the high voltage can be prevented from being leaked to the circuit parts of the ion current detecting means, parts of other circuits, etc., and also the normal operation as the ignition device can be maintained.

In addition, since the secondary current path can be always ensured even in the case disconnection is made at the positions indicated by (B) and (C) of the secondary current path, the normal operation as the ignition device can be maintained.

(Third Embodiment)

Figure 4:
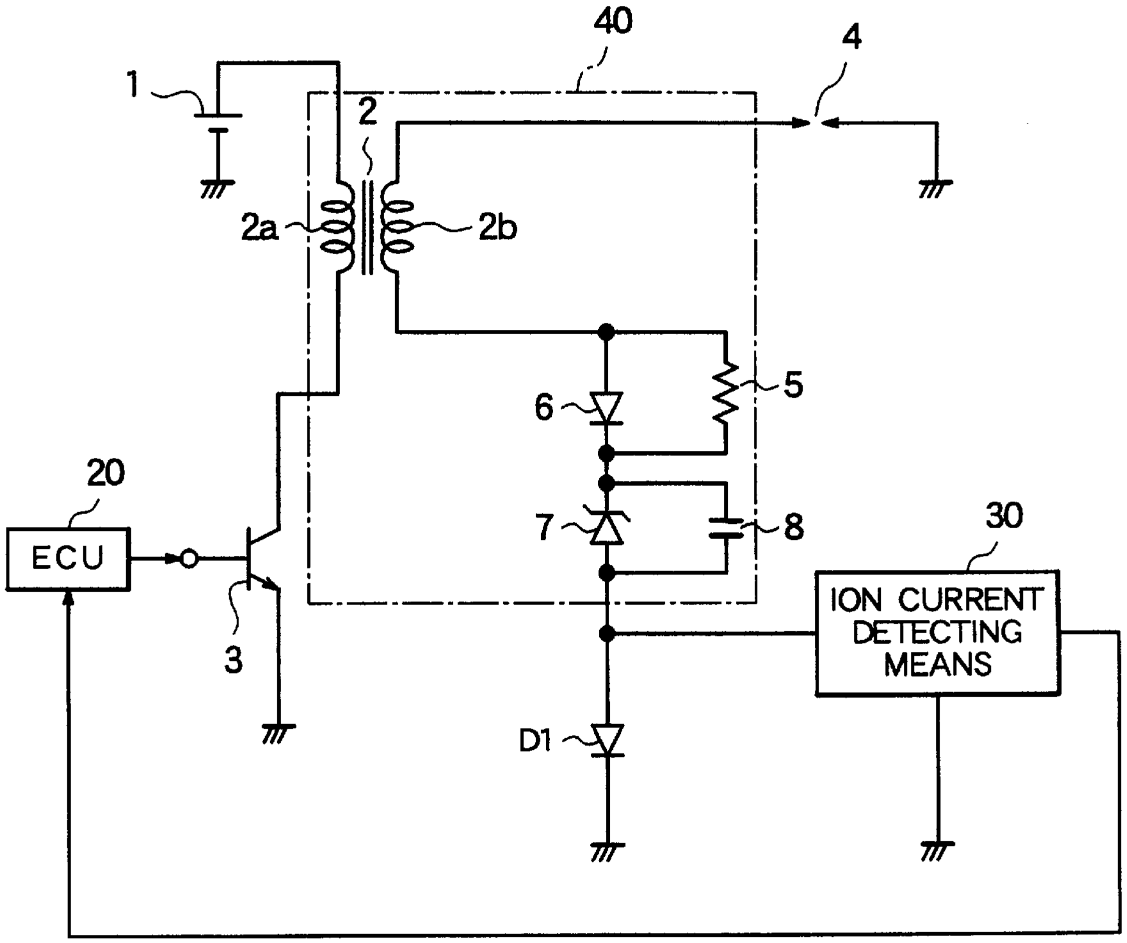
FIG. 4 is a circuit structural diagram showing a combustion state detecting device in accordance with a third embodiment of the present invention.

FIG. 4 is a structural diagram showing a combustion state detecting device for an internal combustion engine in accordance with a third embodiment of the present invention, in which parts corresponding to those in FIG. 1 are indicated by the same references, and their duplicated description will be omitted.

In this embodiment, a resistor 5, a diode 6, a Zener diode 7 and a capacitor 8 are sealed with an insulation sealant 40 of the ignition coil 2, which is made of, for example, epoxy resin, etc. Other structures are identical with those in FIG. 1 except that the Zener diode 9 and the diode 10 disposed as the countermeasure of disconnection as described above are omitted. Accordingly, its operation is also identical with that of FIG. 1 except that the operation of the Zener diode 9 and the diode 10 is omitted, and therefore its description will be omitted.

As described above, since the portion of the secondary winding low voltage side where the high voltage is developed due to the secondary current path disconnection is substantially sealed with the insulation sealant 40, the high voltage is prevented from being leaked.

Also, the potential at the node of the Zener diode 7 and the diode D1 in the case where the high voltage is developed at the secondary winding low voltage side due to the disconnection of the secondary current path does not become the a high voltage since the node is connected to the ion current detecting means 30, and a current substantially corresponding to the positive voltage developing at that node flows to the ground through the diode D1.

As described above, according to this embodiment, since the bias means including the capacitor, etc., and the current limiting means including the resistor, etc., are sealed with the insulation sealant of the ignition coil, discharge between the respective parts or to another device due to the voltage developed when the disconnection of the secondary current path or misfire in the ignition plug occurs can be prevented.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A combustion state detecting device for an internal combustion engine, comprising:

an ignition coil formed of a transformer having a primary winding and a secondary winding for developing a negative ignition high voltage at a high voltage side of said secondary winding when a current to said primary winding is interrupted;

an ignition plug connected to the high voltage side of said secondary winding, said ignition high voltage being applied to said ignition plug;

bias means for charging a positive bias voltage necessary for detecting ions generated when said ignition plug discharges upon application of said ignition high voltage, and said bias means suppressing a voltage developed at said secondary winding when a circuit path in which a secondary current and an ion current flow is disconnected;

current limiting means disposed between the low voltage side of said secondary winding and said bias means for suppressing the drop of said bias voltage;

ion current detecting means for detecting a discharge current from said bias means as said ion current flows through said ignition plug;

an ECU for detecting a combustion state in said ignition plug on the basis of a detection value of said ion current detecting means; and suppressing means for suppressing a voltage developed at said secondary winding when said circuit path in which said secondary current and said ion current flow is disconnected, wherein said secondary current is the current that charges a capacitor in said biasing means.

2. A combustion state detecting device for an internal combustion engine as claimed in claim 1, wherein said suppressing means comprises a first diode and a second diode which are connected in series between the low voltage side of said secondary winding and the ground.

3. A combustion state detecting device for an internal combustion engine as claimed in claim 2, wherein said first diode comprises a Zener diode.

4. A combustion state detecting device for an internal combustion engine as claimed in claim 2, wherein said first and second diode comprise a Zener diode, respectively.

5. A combustion state detecting device for an internal combustion engine as in claim 2, wherein an anode of said first diode is connected to said secondary coil and a cathode of said first diode is connected to a cathode of said second diode.

6. A combustion state detecting device for an internal combustion engine as in claim 5, wherein an anode of said second diode is connected to a ground.

7. A combustion state detecting device for an internal combustion engine, comprising:

an ignition coil formed of a transformer having a primary winding and a secondary winding for developing a negative ignition high voltage at a high voltage side of said secondary winding when a current to said primary winding is interrupted;

an ignition plug connected to the high voltage side of said secondary winding, said ignition high voltage being applied to said ignition plug;

bias means for charging a positive bias voltage necessary for detecting ions generated when said ignition plug discharges upon application of said ignition high voltage;

current limiting means disposed between the low voltage side of said secondary winding and said bias means for suppressing the drop of said bias voltage;

ion current detecting means for detecting a discharge current from said bias means as an ion current flowing through said ignition plug; and an ECU for detecting a combustion state in said ignition plug on the basis of a detection value of said ion current detecting means, and an insulation sealant of said ignition coil for sealing said biasing means and said current limiting means, wherein said insulation sealant prevents high voltage leakage from affecting said biasing means and said current limiting means.

8. A combustion state detecting device for an internal combustion engine as in claim 7, wherein said insulation sealant is an epoxy resin.

* * * * *